(12) United States Patent
Tobias et al.

(10) Patent No.: US 11,774,267 B1
(45) Date of Patent: Oct. 3, 2023

(54) SYSTEM AND APPARATUS FOR SENSING AND PROVIDING ALERTS FOR DEADBOLT LOCK STATUS

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

( * ) Notice: Subject to any disclaimer, the term of this patent is extended or adjusted under 35 U.S.C. 154(b) by 0 days.

(21) Appl. No.: 17/988,225

(22) Filed: Nov. 16, 2022

Related U.S. Application Data

(60) Provisional application No. 63/354,734, filed on Jun. 23, 2022.

(51) Int. Cl.
*E05B 41/00* (2006.01)
*G01D 5/14* (2006.01)
*E05B 63/00* (2006.01)

(52) U.S. Cl.
CPC .............. *G01D 5/14* (2013.01); *E05B 41/00* (2013.01); *E05B 63/0017* (2013.01)

(58) Field of Classification Search
CPC ....... G01D 5/14; E05B 41/00; E05B 63/0017; Y10T 70/5319
USPC .......................................................... 70/129
See application file for complete search history.

(56) References Cited

U.S. PATENT DOCUMENTS

| | | | | |
|---|---|---|---|---|
| 5,933,086 A | * | 8/1999 | Tischendorf | G07C 9/00817 340/5.64 |
| 6,225,903 B1 | * | 5/2001 | Soloway | G08B 25/008 340/5.1 |
| 2015/0292245 A1 | * | 10/2015 | Miller | E05B 65/1073 70/134 |
| 2017/0234033 A1 | * | 8/2017 | DeBoer | E05C 3/046 49/449 |
| 2018/0340350 A1 | * | 11/2018 | Johnson | G07C 9/00944 |

FOREIGN PATENT DOCUMENTS

| | | | | |
|---|---|---|---|---|
| CA | 2485163 A1 | * | 5/2006 | ............ E05B 41/00 |
| JP | 5985033 B1 | * | 9/2016 | |
| KR | 20220101548 A | * | 7/2022 | |
| WO | WO-2006085852 A2 | * | 8/2006 | ......... E05B 63/0017 |
| WO | WO-2018055398 A1 | * | 3/2018 | ........... E05B 13/004 |

* cited by examiner

*Primary Examiner* — Suzanne L Barrett
(74) *Attorney, Agent, or Firm* — Jeffrey A. Proehl; Woods, Fuller, Shultz & Smith, PC (57) ABSTRACT

A deadbolt lock status sensing assembly for monitoring status of a deadbolt member of a deadbolt assembly on a door may include a sensible element mountable on one of the door and the deadbolt assembly, and a sensing element mountable on one of the door and the deadbolt assembly. The sensing element and the sensing element may be configured to move with respect to each other when the deadbolt member of the deadbolt assembly moves between an extended condition and a retracted condition of the deadbolt.

17 Claims, 7 Drawing Sheets

SYSTEM AND APPARATUS FOR SENSING AND PROVIDING ALERTS FOR DEADBOLT LOCK STATUS

REFERENCE TO RELATED APPLICATIONS

This application claims the priority benefit of U.S. Provisional Patent Application No. 63/354,734, filed Jun. 23, 2022, which is hereby incorporated by reference in its entirety.

BACKGROUND

Field

The present disclosure relates to door locking apparatus and more particularly pertains to a new system and apparatus for sensing and providing alerts for deadbolt lock status for providing a remote indication of the positional status of a deadbolt of a deadbolt lock.

SUMMARY

In some aspects, the present disclosure relates to a deadbolt lock status sensing assembly for monitoring status of a deadbolt member of a deadbolt assembly on a door. The status sensing assembly may comprise a sensible element mountable on one of the door and the deadbolt assembly, and the sensible element may be magnetically active. The assembly may also include a sensing element mountable on one of the door and the deadbolt assembly. The sensible element and the sensing element may be configured to move with respect to each other when the deadbolt member of the deadbolt assembly moves between an extended condition and a retracted condition of the deadbolt.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new system and apparatus for sensing and providing alerts for deadbolt lock status embodying the principles and concepts of the disclosed subject matter will be described.

In some aspects, the disclosure relates to a door system 1 which may be employed in conjunction with an alarm system 2 and may broadly include a door 10, a door frame 20 of a building structure, a deadbolt assembly 30 mounted on the door for securing the door in the closed position with respect to the door frame, a deadbolt actuation mechanism 40 for operating the deadbolt assembly, and a deadbolt lock status sensing assembly 50 communicating a status of a deadbolt of the deadbolt assembly. In further aspects, the disclosure relates to the deadbolt lock status sensing assembly 50 separate of other elements of the system 1.

In greater detail regarding elements of the disclosure, the door 10 generally has opposite broad faces 12, 13 and at least one edge face 14 that extends between the broad faces. The door 10 may also have suitable structure for incorporating a deadbolt assembly, which may include a primary channel which extends through the door and between the broad faces 12, 13, as well as a secondary channel which extends from the edge face 14 to the primary channel.

Figure 9:
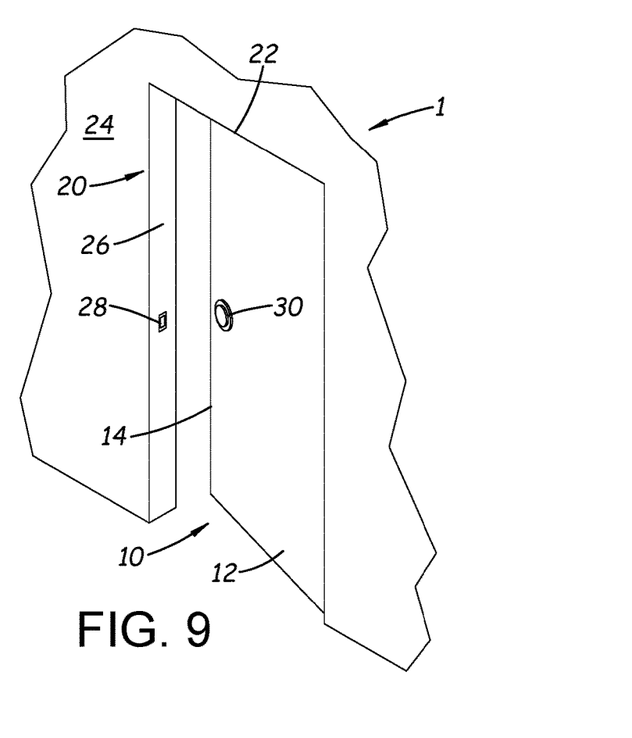
FIG. 9 is a schematic perspective view of a door in a door frame formed in a wall of a building structure.

Another element of the system 1, door frame 20, may define an opening 22 formed in a wall 24 of a building structure, and the door 10 is usually mounted on the door frame 20 in a manner that permits movement of the door with respect to the doorframe between an open condition, which may be characterized by the door being moved away from portions of the door frame to permit movement through the opening of the door frame, a closed condition, which may be characterized by the door obstructing movement through the door frame and the door frame 20 extending about the door when the door is in the closed condition. The doorframe 20 may include a latch portion 26 of the door frame which extends along at least the one edge face 14 of the door when the doors in the closed condition, and the latch portion may have a bolt cavity 28 formed therein.

The deadbolt assembly 30 is mounted on the door 10 for selectively securing the door in the door frame 20. The deadbolt assembly 30 may be at least partially positioned in the primary channel of the door, and may also be at least partially positioned in the secondary channel of the door. The deadbolt assembly 30 may include a deadbolt frame 32 mountable on the door, such as by at least part insertion of the frame into the secondary channel of the door and the frame 32 may also at least partially extend into the primary channel of the door.

The deadbolt assembly 30 may further include a deadbolt member 34 which is movably mounted on the door 10 such that the deadbolt member is movable along a portion of the deadbolt frame and a portion of the secondary channel. The deadbolt member 34 may be selectively extendable and retractable with respect to the door, such as from the edge face 14 of the door. The deadbolt member 34 may be movable between an extended condition and a retracted condition with respect to the door. Illustratively, the extended condition of the deadbolt member 34 may be characterized by a portion of the deadbolt member being extended from the door and extended into the bolt cavity 28 of the door frame. The retracted condition of the deadbolt member 34 may be characterized by the entirety, or substantially the entirety, of the member 34 being withdrawn into the door so as not to protrude from the door to any significant degree. The deadbolt member 34 may have an inboard end and an outboard end 38, with the inboard end being generally positioned in the secondary channel of the door and the outboard end being extended from the door when the deadbolt member is in the extended condition.

The deadbolt actuation mechanism 40 is configured to move the deadbolt member 34 between the extended and retracted condition, usually by physical operation or manipulation of elements of the mechanism by a user. The deadbolt actuation mechanism 40 may be mounted on the deadbolt frame 32 and engage the deadbolt member 34 to produce movement of the member 34. In greater detail, illustrative embodiments of the deadbolt actuation mechanism 40 may include a deadbolt thumbturn 42 which is configured to permit physical (e.g., finger) manipulation of the deadbolt actuation mechanism.

The deadbolt thumbturn 42 may be movable between a locking position and an unlocking position. The locking position of the thumbturn 42 may correspond to the extended condition of the deadbolt member 34 and the unlocking position may correspond to the retracted condition of the deadbolt member. The deadbolt thumbturn 42 is typically rotatable with respect to the deadbolt frame, and may rotate approximately 90 degrees from the locking position to the unlocking position. The deadbolt thumbturn 42 may include a knob which is elongated in shape, and may have a first end 44 which is movable between a first position, when the thumbturn is in the locking position, and a second position, when the thumbturn is in the unlocking position. It will be recognized that other types of elements may be utilized to permit finger manipulation of the deadbolt actuation mechanism, and may result in other types of movement of the element between locking and unlocking positions such as, for example, linear or translational movement between the locking and unlocking positions.

The deadbolt activation mechanism 40 may further include a deadbolt cam bar 46 which is rotatable with respect to the deadbolt frame 32 to move the deadbolt member between the extended and retracted conditions. The deadbolt thumbturn 42 may be mounted on the deadbolt cam bar 46 such that the thumbturn and the cam bar move as a unit. Further, a deadbolt cam 48 may be mounted on the cam bar 46 so that the cam rotates with the cam bar, and may have a camming surface. The deadbolt actuation mechanism 40 may also include a lock cylinder 49 which is actuated by a key and is typically located on the side of the door that is opposite of the side of the door on which the deadbolt thumbturn is located.

The deadbolt lock status sensing assembly 50 may be configured to monitor the status of the deadbolt of the deadbolt assembly, and may sense at least one position of the deadbolt thumbturn 42. In some implementations, the sensing assembly 50 may sense a change in the status of the deadbolt, such as a change in the position status of the deadbolt. Illustratively, the status sensing assembly 50 may be configured to sense the locking position of the deadbolt thumbturn.

The status sensing assembly 50 may comprise a sensible element 52 which is mountable on the door 10 and provides a sensible indicator for the position of the deadbolt member 30 by association with a component of the deadbolt actuation mechanism 40. The sensible element may be magnetically active, and may be at least partially formed from magnetically active material. Illustratively, the sensible element 52 may comprise a magnet 54 that generates a magnetic field proximate to the first end 44 of the deadbolt thumbturn.

In embodiments such those shown in FIGS. 1 through 5, the sensible element 52 may be configured such that a position of the sensible element is changed as a result of operation of the deadbolt actuation mechanism 40. Illustratively, the sensible element 52 may be mounted on the deadbolt thumbturn 42, and the position of the sensible element may be moved when the deadbolt thumbturn moves between the locking and unlocking positions. The sensible element 52 may have a lock location when the deadbolt thumbturn is in the locking position and the deadbolt member is in the extended condition, and the sensible element may have an unlock location when the deadbolt thumbturn is in the unlocking position and the deadbolt member is in the retracted condition. In embodiments such as those shown in FIGS. 6A and 6B, the sensible element 52 has a fixed position with respect to the door 10, and the sensible element may correspondingly be mounted on the door in the fixed position.

The status sensing assembly 50 may further comprise a sensing element 60 which is configured to sense the sensible element 52 when the deadbolt thumbturn is in at least one of the locking and unlocking positions, and may also provide an alert corresponding to the sensed position. The sensing element 60 may be mounted on the door 10 to move with the door between the conditions of the door.

In embodiments such as those shown in FIGS. 1 through 6, the sensing element 60 is fixedly mounted on the door at a fixed position. The sensing element 60 of such embodiments may be configured to sense at least one position of the thumbturn 42 based upon movement of the sensible element 52 with respect to the fixed position of the sensing element. Illustratively, the sensing element 60 may be being configured to sense the positon of the sensible element 52 when the sensible element is in the lock location. Optionally, but less preferably, the sensing element may be configured to detect the positon of the sensible element when the sensible element is in the unlock location. In embodiments such as those shown in FIGS. 6A and 6B, the sensing element 60 is movably mounted on the door 10, and the sensing element may be configured to be moved by the deadbolt actuation mechanism 40 as the mechanism 40 moves the deadbolt member 34 between the extended and retracted conditions. The sensing element 60 may have an unlocked location corresponding to the retracted condition of the deadbolt member (see, e.g., FIG. 6A) and a locked location corresponding to the extended condition of the deadbolt member (see, e.g., FIG. 6B).

The sensing element 60 may comprise a sensor 62 configured to sense at least one of the positions of the deadbolt. The sensor 62 may be configured to generate a status signal corresponding to one or more specific sensed positions of the thumbturn (e.g., via the position or location of the sensing element). Optionally, the sensor 62 may be configured to generate the status signal upon sensing a change of position of the thumbturn (e.g., via the position or location of the sensing element). The sensor 62 may be sensitive to the magnetic field of the sensible element 52, and produce the status signal based upon detecting the proximity or relative strength of the magnetic field of the sensible element. The sensing element 60 may further include a transmitter 64 configured to receive the status signal from the sensor, and wirelessly transmit the status signal to a receiver. A power source 66 of the sensing element 60 may provide power to elements of the element 60, such as the sensor 62 and the transmitter 64. In some embodiments, the sensing element 60 may include a case 70 which defines an interior and has an exterior surface 74. Elements of the sensing element 60, such as the sensor 62 and the transmitter 64, may be positioned in the interior of the case.

Figure 1:
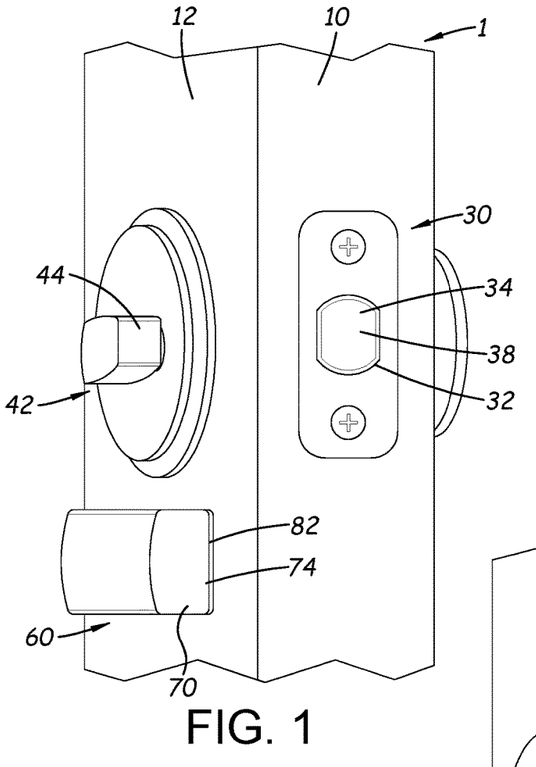
FIG. 1 is a schematic perspective view of a new system for sensing and providing alerts for deadbolt lock status, with the deadbolt in a retracted condition and the deadbolt thumbturn in the unlocking position, according to the present disclosure.
Figure 2:
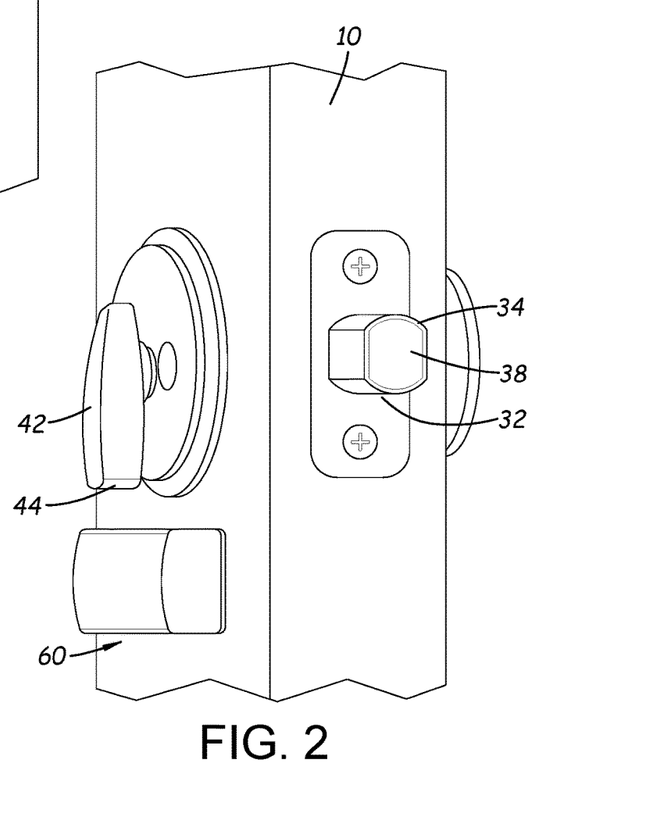
FIG. 2 is a schematic perspective view of the system for sensing and providing alerts for deadbolt lock status, with the deadbolt in an extended condition and the deadbolt thumbturn in the locking position, according to the present disclosure.
Figure 3:
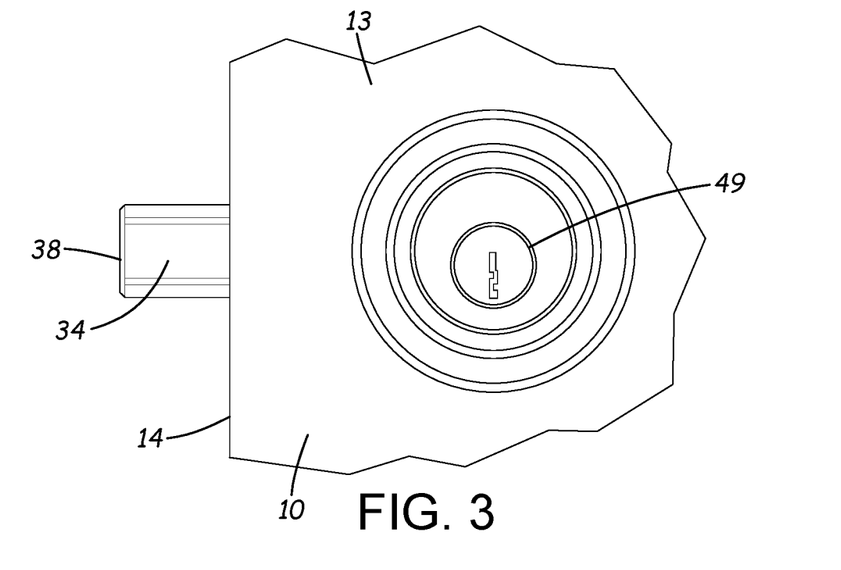
FIG. 3 is a schematic side view of the system for sensing and providing alerts for deadbolt lock status, according to an illustrative embodiment.
Figure 4A:
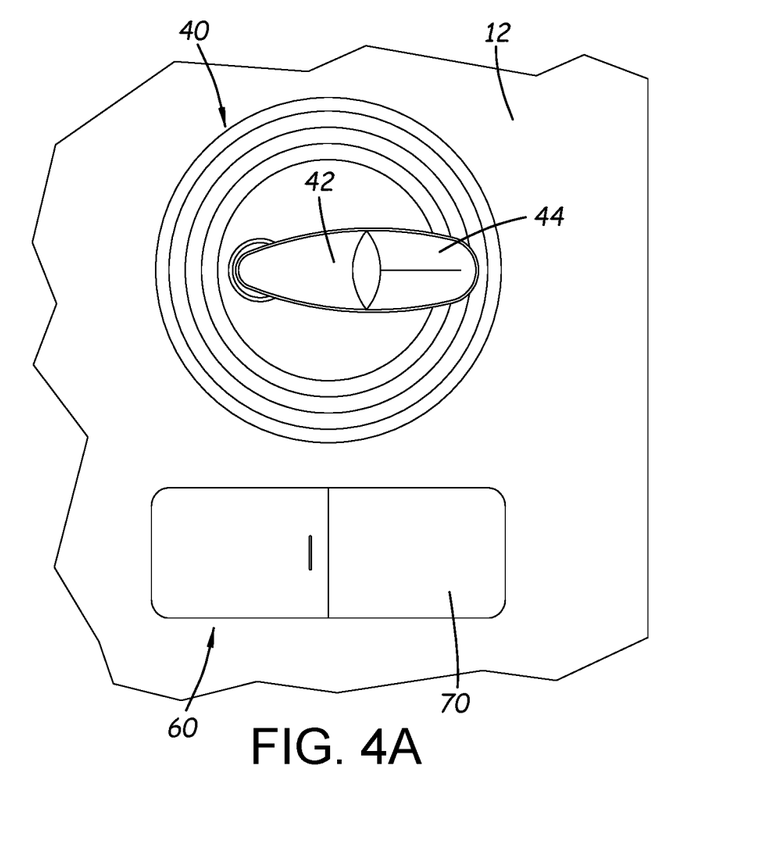
FIG. 4A is a schematic side view of the system with the deadbolt thumbturn in the unlocking position in relation to the sensing element of the sensing assembly, according to an illustrative embodiment.
Figure 4B:
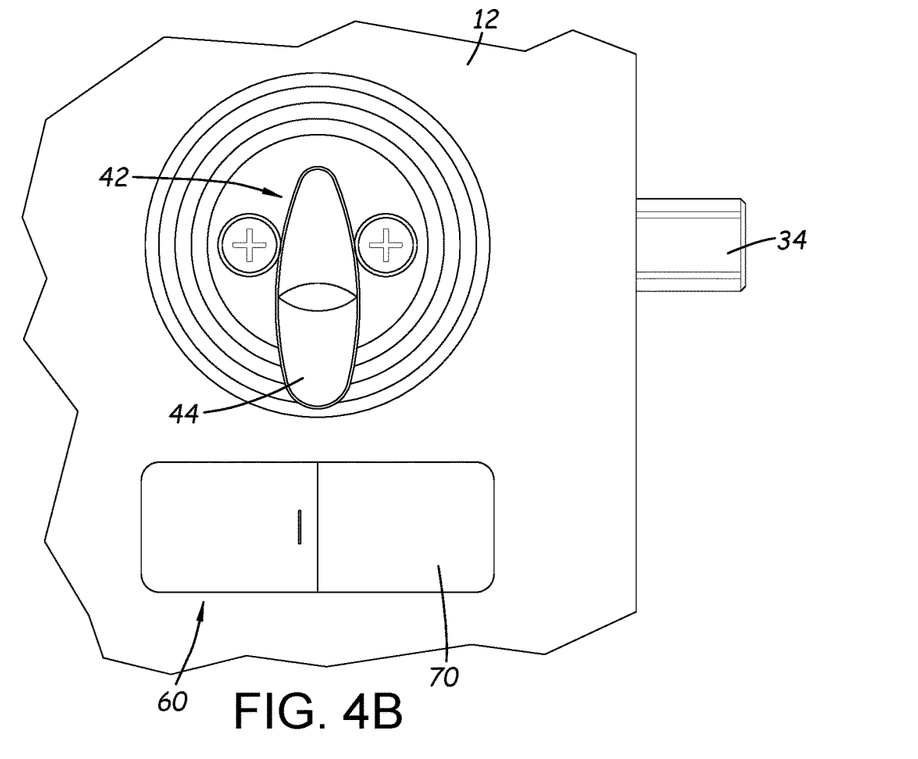
FIG. 4B is a schematic side view of the system with the deadbolt thumbturn in the locking position in relation to the sensing element of the sensing assembly, according to an illustrative embodiment.
Figure 5A:
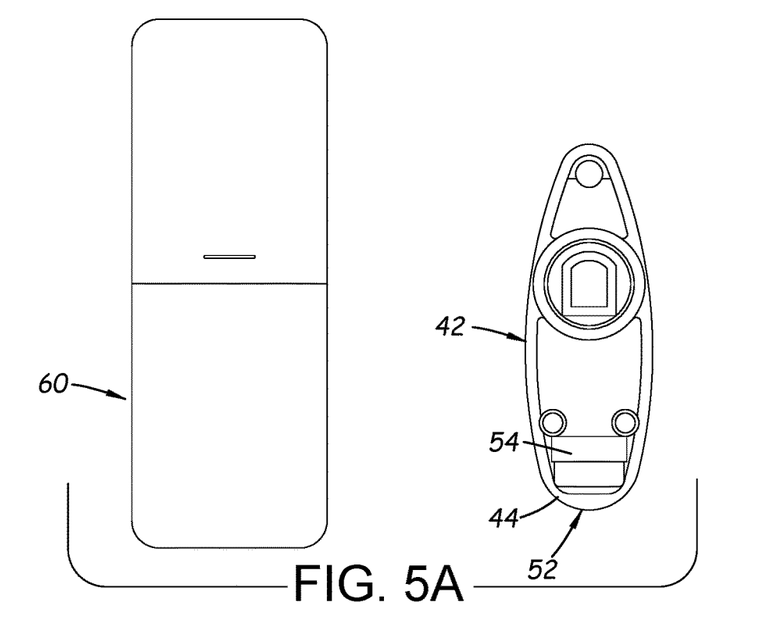
FIG. 5A is a schematic rear view of an exemplary thumbturn in the unlocking position with sensible element in the unlock location in an illustrative depiction of the relationship with the sensing element, according to an illustrative embodiment.
Figure 5B:
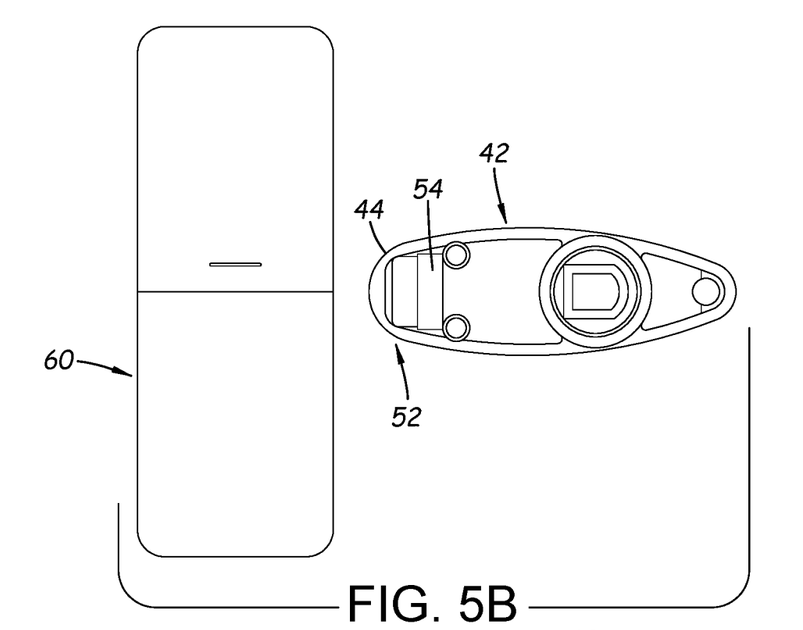
FIG. 5B is a schematic rear view of an exemplary thumbturn in the locking position with sensible element in the lock location in an illustrative depiction of the relationship with the sensing element, according to an illustrative embodiment.
Figure 6A:
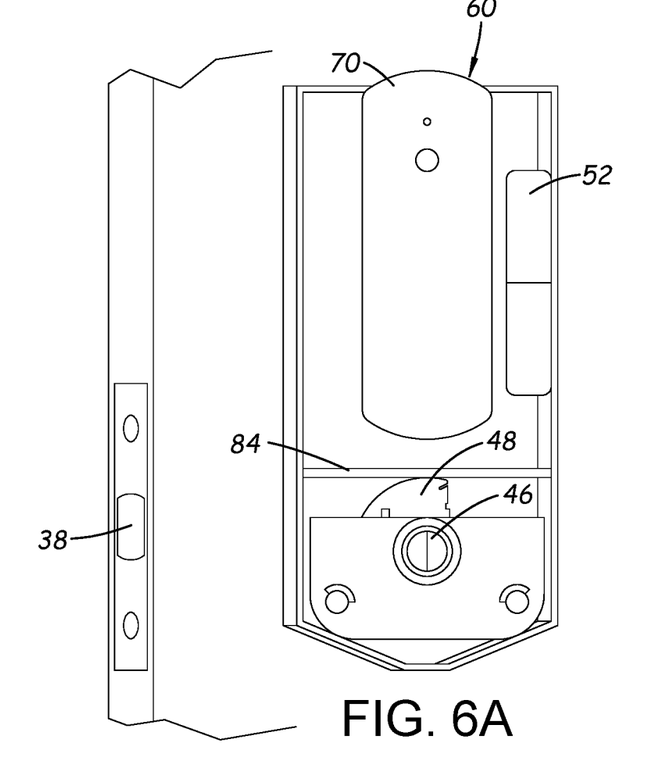
FIG. 6A is a schematic rear view of another exemplary deadbolt lock status sensing assembly shown with elements of a deadbolt actuation mechanism and having an external cover removed to show the mechanism in the unlocking position with the sensing element in the unlock location, according to an illustrative embodiment.
Figure 6B:
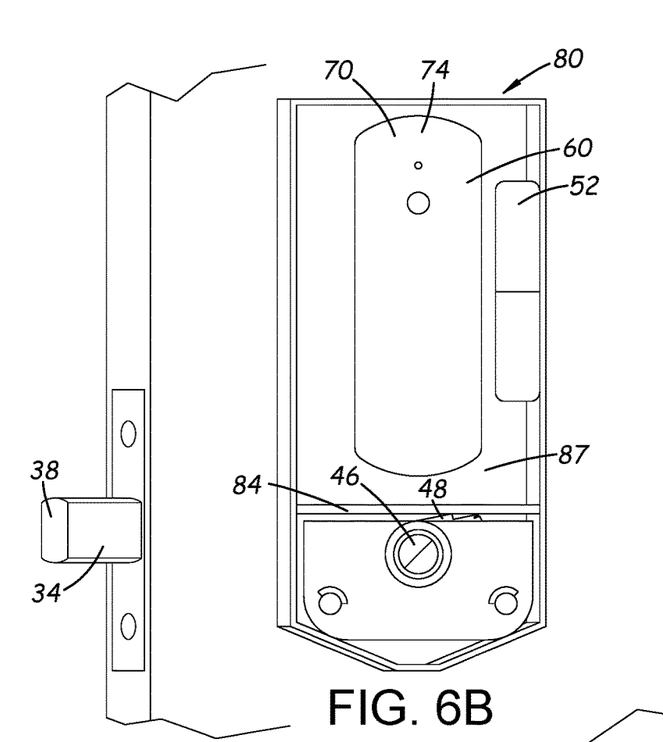
FIG. 6B is a schematic rear view of the exemplary deadbolt lock status sensing assembly of FIG. 7A with the deadbolt actuation mechanism shown in the locking position with the sensing element in the lock location, according to an illustrative embodiment.

The sensing element 60 may also have an attachment structure 80 provided on the element 60, such as on the case 70, for mounting the sensing element on the door 10. In embodiments such as shown in FIGS. 1 through 5, the attachment structure 60 may be positioned on the exterior surface 74 of the case to fixedly attach the case to the door 10. Illustratively, the attachment structure 80 may include an adhesive 82 on the exterior surface. In embodiments such as shown in FIGS. 6A and 5B, the attachment structure 80 may comprise a slider 84 on which other elements of the sensing element 60 may be mounted, such as the case 70 and the sensor 62, may be mounted. The slider 84 may be configured to be moved by the deadbolt actuation mechanism 40, such as by the deadbolt cam of the actuation mechanism. The slider 84 may be positioned so as to support the sensing element 60 in a positon that is adjacent to the sensible element 52 in at least one position of the sensing element with respect to the sensible element, which would permit the sensor 62 to sense the magnetic field of the sensible element. Embodiments of the types shown in FIGS. 6A and 6B may also include a track forming element 86 on which the slider 84 is mounted for facilitating translational movement of the slider with respect to the door 10. The slider 84 may be slidably mounted on the track forming element 86, and the track forming element 86 may be mounted on the door.

Figure 7:
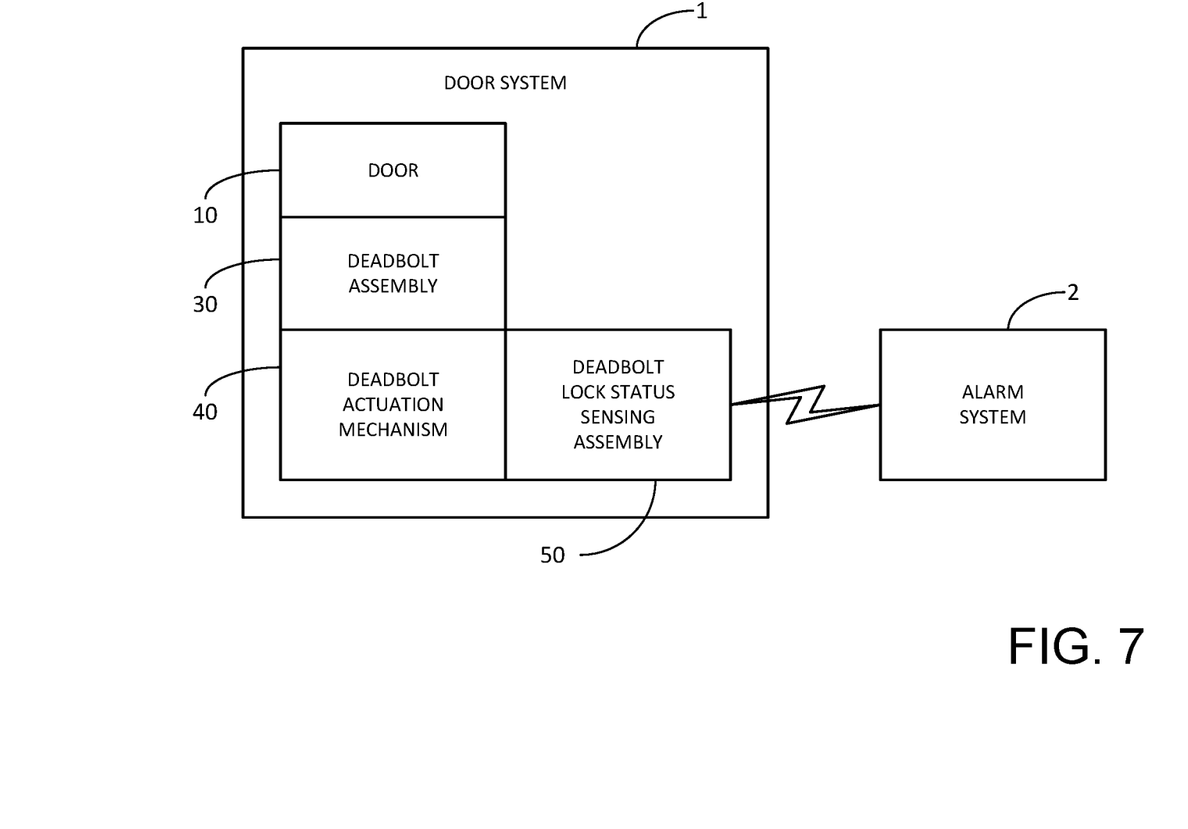
FIG. 7 is a schematic diagram of an embodiment of the new system in relations to an alarm system.
Figure 8:
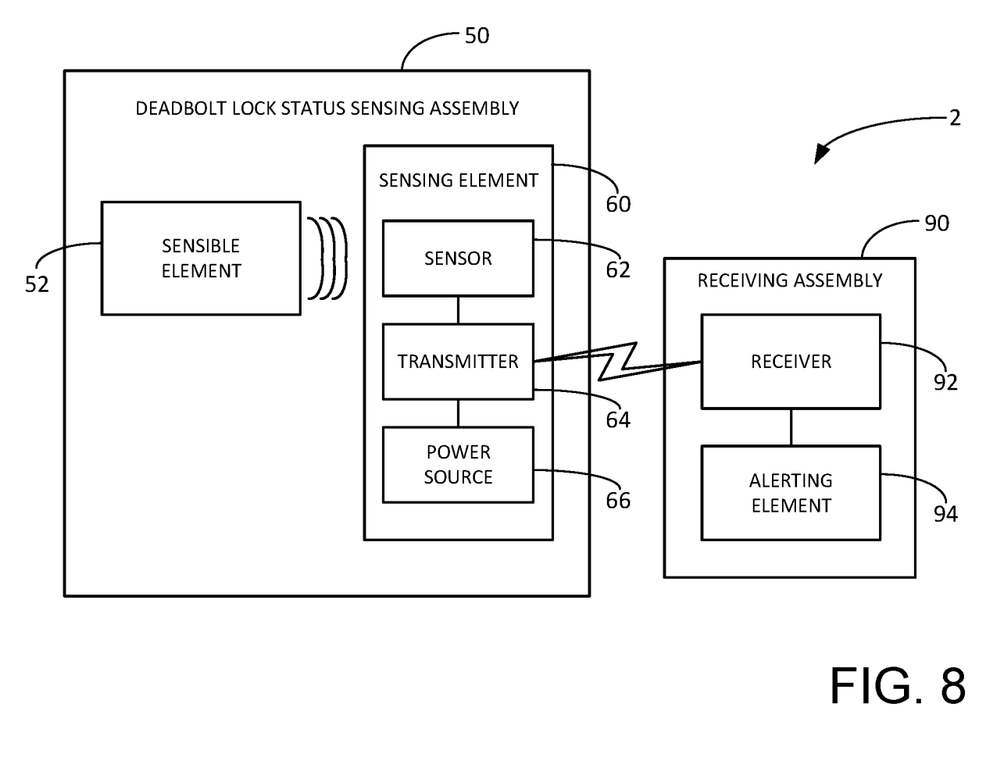
FIG. 8 is a schematic diagram of an embodiment of the new deadbolt lock status sensing assembly, according to an illustrative embodiment.

The deadbolt lock status sensing assembly 50 may be interfaced to a receiving assembly 90 configured to receive the status signal from the sensing element 60, and the receiving assembly may form a portion of an alarm system 2. The receiving assembly 90 may include a receiver 92 configured to wirelessly receive the status signal from the transmitter 64 of the sensing element. The receiving assembly 90 may also include an alerting element 94 in communication with the receiver 92 to receive the status signal from the receiver and produce a perceptible alert based upon receipt of the status signal.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A deadbolt lock status sensing assembly for monitoring status of a deadbolt member of a deadbolt assembly for releasably securing a door in a closed condition in a doorframe, the deadbolt assembly having a deadbolt actuation mechanism for moving the deadbolt member between an extended condition and a retracted condition, the deadbolt actuation mechanism including a deadbolt thumbturn configured to permit finger operation of the deadbolt actuation mechanism to move the deadbolt member, the deadbolt thumbturn having a locking position corresponding to the extended condition of the deadbolt member and an unlocking position corresponding to the retracted condition of the deadbolt member, the door being of the type having a broad face from which the deadbolt thumbturn protrudes, the status sensing assembly comprising:
- a sensible element mountable on the thumbturn of the deadbolt assembly to move with the thumbturn as the thumbturn moves between the locking and unlocking positions, the sensible element being magnetically active;
- a sensing element mountable on the door in a fixed position proximate to the deadbolt thumbturn and being configured to sense a change in proximity of the magnetically-active sensible element to the sensing element, the sensing element including:
  - a case; and
  - an attachment structure configured to fixedly attach the case of the sensing element to the broad face of the door, the attachment structure being configured to permit attachment of the case by a user of the status sensing assembly to the broad face of the door in a position on the door such that the case is closer to the deadbolt thumbturn when the deadbolt thumbturn is in the locking position than when the deadbolt thumbturn is in the unlocking position;
- wherein the sensible element is mountable on the deadbolt thumbturn such that movement of the deadbolt thumbturn between the locking and unlocking positions changes a location of the sensible element in relationship to the sensing element.

2. The assembly of claim 1 wherein the sensible element comprises a magnet generating a magnetic field; and
wherein the sensing element is configured to sense a change in proximity of the magnetic field of the magnet of the sensible element to the sensing element.

3. The assembly of claim 1 wherein a position of the sensible element is configured to be changed with respect to the fixed position of the sensing element as a result of operation of the deadbolt actuation mechanism.

4. The assembly of claim 1
wherein the sensible element is mountable on the deadbolt thumbturn such that the sensible element moves in a plane substantially parallel to the broad face of the door.

5. The assembly of claim 1 wherein the sensible element has a lock location when the deadbolt thumbturn is in the locking position and the deadbolt member is in the extended condition, the sensible element having an unlock location when the deadbolt thumbturn is in the unlocking position and the deadbolt member is in the retracted condition.

6. The assembly of claim 1 wherein the deadbolt thumbturn is rotatable with respect to a door on which it is mounted to move the deadbolt thumbturn between the locking and unlocking positions; and
wherein the sensible element is configured to be rotated by rotation of the deadbolt thumbturn between the lock location and the unlock location of the sensible element.

7. The assembly of claim 6 wherein the deadbolt thumbturn is elongated in shape with opposite ends that rotate in a plane oriented substantially perpendicular to a rotation axis of the deadbolt thumbturn about which the deadbolt thumbturn rotates between the locking and unlocking positions; and
wherein the sensible element is configured to mount on the deadbolt thumbturn toward one of the opposite ends at a location offset from the rotation axis such that rotation of the deadbolt thumbturn swings the sensible element toward and away from the sensing element.

8. The assembly of claim 1 wherein the sensing element comprises a sensor configured to sense at least one of the positions of the deadbolt thumbturn, the sensor being configured to generate a status signal corresponding to the sensed position of the thumbturn.

9. The assembly of claim 8 wherein the sensor is configured to generate the status signal upon a change of position of the deadbolt thumbturn.

10. The assembly of claim 9 wherein the sensing element additionally comprises a transmitter configured to receive the status signal from the sensor, the transmitter being configured to wirelessly transmit the status signal to a receiver.

11. The assembly of claim 1 wherein the attachment structure includes an adhesive.

12. A system comprising:
- a door mounted on a doorframe and movable between a closed condition and an open condition, the door having at least one broad face;
- a deadbolt assembly for releasably securing the door in the closed condition, the deadbolt assembly being mounted on the door, the deadbolt assembly comprising:
  - a deadbolt member movable between an extended condition and a retracted condition,
  - a deadbolt actuation mechanism for moving the deadbolt member between the extended and retracted conditions, the deadbolt actuation mechanism including a deadbolt thumbturn configured to permit finger operation of the deadbolt actuation mechanism to move the deadbolt member, the deadbolt thumbturn having a locking position corresponding to the extended condition of the deadbolt member and an unlocking position corresponding to the retracted condition of the deadbolt member; and
- a deadbolt lock status sensing assembly for monitoring status of the deadbolt member of the deadbolt assembly, the sensing assembly comprising:
  - a sensible element mounted on the thumbturn of the deadbolt assembly to move with the thumbturn as the thumbturn moves between the locking and unlocking positions, the sensible element being magnetically active;
  - a sensing element mounted on the broad face of the door in a fixed position proximate to the deadbolt thumbturn and being configured to sense a change in proximity of the magnetically-active sensible element to the sensing element, the sensible element being moved with respect to the sensing element by movement of the deadbolt thumbturn between the locking and unlocking positions as the deadbolt member of the deadbolt assembly moves between the extended condition and the retracted condition; and
  - wherein the sensing element comprises:
    - a sensor configured to sense at least one of the positions of the deadbolt thumbturn and generate a status signal corresponding to the sensed position of the deadbolt thumbturn;

a transmitter configured to receive the status signal from the sensor and wirelessly transmit the status signal to a receiver;

a case defining an interior and having an exterior surface, the sensor, the transmitter, and the power source being positioned in the interior of the case; and an attachment structure positioned on the exterior surface of the case, the attachment structure comprising an adhesive on the exterior surface of the case attaching the case in the fixed position to the broad face of the door in a position on the door such that the case is closer to the deadbolt thumbturn when the deadbolt thumbturn is in the locking position than when the deadbolt thumbturn is in the unlocking position;

wherein the sensible element is mountable on the deadbolt thumbturn such that movement of the deadbolt thumbturn with the sensible element between the locking and unlocking positions changes a location of the sensible element in relationship to the sensing element.

13. The system of claim 12 wherein the sensible element comprises a magnet generating a magnetic field; and wherein the sensing element is configured to sense a change in proximity of the magnetic field of the magnet of the sensible element to the sensing element.

14. The system of claim 12 wherein the sensible element is mounted on the deadbolt thumbturn such that the sensible element moves in a plane substantially parallel to the broad face of the door to change a location of the sensible element in relationship to the sensing element when the deadbolt thumbturn moves between the locking and unlocking positions.

15. The system of claim 14 wherein the deadbolt thumbturn rotates between the locking and unlocking positions about a rotation axis with respect to the door, the deadbolt thumbturn being elongated in shape with opposite ends that rotate in a plane oriented substantially perpendicular to the rotation axis; and wherein the sensible element is configured to mount on the deadbolt thumbturn toward one of the opposite ends at a location offset from the rotation axis such that rotation of the deadbolt thumbturn swings the sensible element toward and away from the sensing element.

16. The system of claim 13 wherein the deadbolt thumbturn rotates between the locking and unlocking positions about a rotation axis with respect to the door, the deadbolt thumbturn being elongated in shape with opposite ends that rotate in a plane oriented substantially perpendicular to the rotation axis; and wherein the deadbolt thumbturn has a cavity located toward one of the opposite ends of the thumbturn, the magnet of the sensible element being positioned in the cavity such that a distance between the magnet of the sensible element and the sensing element is different in the locking position and the unlocking position of the deadbolt thumbturn.

17. A deadbolt lock status sensing assembly for use with a door mounted on a door frame and a deadbolt assembly mounted on the door to monitor a status of a deadbolt member of the deadbolt assembly movable between an extended condition securing the door in a closed condition in the door frame and a retracted condition releasing the door to move with respect to the door frame to an open condition, the deadbolt assembly having a deadbolt actuation mechanism for moving the deadbolt member between, the deadbolt actuation mechanism including a deadbolt thumbturn configured to permit finger operation of the deadbolt actuation mechanism to move the deadbolt member, the deadbolt thumbturn having a locking position corresponding to the extended condition of the deadbolt member and an unlocking position corresponding to the retracted condition of the deadbolt member, the door being of the type having a broad face from which the deadbolt thumbturn protrudes, the status sensing assembly comprising:

a sensible element mountable on the deadbolt thumbturn to move with the thumbturn as the thumbturn moves between the locking and unlocking positions, the sensible element comprising a magnet generating a magnetic field;

a sensing element mountable on the door in a fixed position proximate to the deadbolt thumbturn and being configured to sense a change in proximity of the magnetic field of the magnet of the sensible element to the sensing element, the sensing element comprising:

a sensor configured to sense at least one of the positions of the deadbolt thumbturn and generate a status signal corresponding to the sensed position of the deadbolt thumbturn;

a transmitter configured to receive the status signal from the sensor and wirelessly transmit the status signal to a receiver;

a power source configured to provide power to the sensor and the transmitter;

a case defining an interior and having an exterior surface, the sensor, the transmitter, and the power source being positioned in the interior of the case; and an attachment structure positioned on the exterior surface of the case, the attachment structure comprising an adhesive on the exterior surface of the case to permit attachment of the case in the fixed position by a user of the status sensing assembly to the broad face of the door in a position on the door such that the case is closer to the deadbolt thumbturn when the deadbolt thumbturn is in the locking position than when the deadbolt thumbturn is in the unlocking position;

wherein the sensible element is mountable on the deadbolt thumbturn such that movement of the deadbolt thumbturn with the sensible element between the locking and unlocking positions changes a location of the sensible element in relationship to the sensing element.

* * * * *